United States Patent
Zukerman et al.

(10) Patent No.: US 11,635,544 B2
(45) Date of Patent: Apr. 25, 2023

(54) SYSTEM AND METHOD FOR DETERMINING OPTIMAL PATH ARRANGEMENTS FOR AN INFRASTRUCTURE LINK WITH TERRAIN SLOPE CONSIDERATION

(71) Applicant: City University of Hong Kong, Kowloon (HK)

(72) Inventors: Moshe Zukerman, Kowloon (HK); Zengfu Wang, Shaanxi (CN); Qing Wang, Kowloon (HK); Bill Moran, Kowloon (HK); Elias Tahchi, Quarry Bay (HK)

(73) Assignee: City University of Hong Kong, Kowloon (HK)

( * ) Notice: Subject to any disclaimer, the term of this patent is extended or adjusted under 35 U.S.C. 154(b) by 582 days.

(21) Appl. No.: 15/992,559

(22) Filed: May 30, 2018

(65) Prior Publication Data

US 2019/0369290 A1 Dec. 5, 2019

(51) Int. Cl.
*G01V 99/00* (2009.01)
*G06Q 10/06* (2012.01)
(Continued)

(52) U.S. Cl.
CPC ......... *G01V 99/005* (2013.01); *G06Q 10/067* (2013.01); *G06Q 10/06313* (2013.01); *H02G 1/06* (2013.01)

(58) Field of Classification Search
None
See application file for complete search history.

(56) References Cited

U.S. PATENT DOCUMENTS

| | | | |
|---|---|---|---|
| 2003/0021633 A1* | 1/2003 | Seto | H02G 1/08 405/177 |
| 2004/0158355 A1* | 8/2004 | Holmqvist | G05D 1/0236 701/23 |

(Continued)

OTHER PUBLICATIONS

Cao, C., Wang, Z., Zukerman, M., Manton, J. H., Bensoussan, A., & Wang, Y., Optimal Cable Laying Across an Earthquake Fault Line Considering Elliptical Failures, (2016), IEEE Transactions on Reliability, 65(3), 1536-1550. (Year: 2016).*

(Continued)

*Primary Examiner* — Brian M Epstein
*Assistant Examiner* — Sara Grace Brown
(74) *Attorney, Agent, or Firm* — Renner Kenner Greive Bobak Taylor & Weber

(57) ABSTRACT

A method for determining optimal path arrangements for an infrastructure link between two geographic locations, in particular, in uneven terrain. The method includes modelling a geographic terrain containing the two geographic locations; optimizing an arrangement cost and a repair rate for two or more potential paths based on the modelled geographic terrain, an arrangement cost model, and a repair rate model, taking into account at least two design levels, wherein the arrangement cost model incorporates direction-dependent factor and direction-independent factor associated with the path arrangements; and determining the optimal path arrangements each including multiple path portions and respective design levels associated with the path portions based on the optimization.

13 Claims, 10 Drawing Sheets
(5 of 10 Drawing Sheet(s) Filed in Color)

(51) Int. Cl.
*H02G 1/06* (2006.01)
*G06Q 10/067* (2023.01)
*G06Q 10/0631* (2023.01)

(56) References Cited

U.S. PATENT DOCUMENTS

| | | | |
|---|---|---|---|
| 2011/0270793 A1* | 11/2011 | Bertogg | G06Q 40/06 706/50 |
| 2012/0084231 A1* | 4/2012 | McNaught | G06Q 30/0283 705/400 |
| 2012/0274440 A1* | 11/2012 | Meadows | G01V 1/008 340/3.42 |
| 2013/0338984 A1* | 12/2013 | Braaksma | G01V 11/00 703/10 |
| 2017/0003694 A1* | 1/2017 | Carvajal | E21B 43/30 |
| 2017/0154130 A1* | 6/2017 | Dewell | G06Q 10/067 |
| 2017/0323235 A1* | 11/2017 | Johnston | H04W 4/00 |
| 2018/0216752 A1* | 8/2018 | Pigliapoco | F16L 1/19 |
| 2019/0137639 A1* | 5/2019 | Walsh, III | G06N 7/005 |
| 2019/0237217 A1* | 8/2019 | Shroll | H01B 7/14 |
| 2019/0266674 A1* | 8/2019 | Kownacki | G06Q 50/26 |

OTHER PUBLICATIONS

Kongar, I., Giovinazzi, S., Rossetto, T., Seismic performance of buried electrical cables: evidence-based repair rates and fragility functions, 2017, Bull Earthquake Eng (2017) 15:3151-3181 DOI 10.1007/s10518-016-0077-3 (Year: 2017).*
Msongaleli, D., Dikbiyik, F., Zukerman, M., Mukherjee, B.; Disaster-Aware Submarine Fiber-Optic Cable Deployment for Mesh Networks, (Sep. 15, 2016), Journal of Lightwave Technology, vol. 34, No. 18 (Year: 2016).*
Shen, Z., Vladimirsky, A.; Piecewise-Deterministic Optimal Path-Planning; (Dec. 29, 2015), Center for Applied Mathematics and Department of Mathematics Cornell University (Year: 2015).*
Tran, P., Saito, H., "Geographical Route Design of Physical Networks Using Earthquake Risk Information," (Jul. 2016), Network and Service Management (Year: 2016).*
Li, Hao, et al. "A level set method for topological shape optimization of 3D structures with extrusion constraints." 2015. Computer Methods in Applied Mechanics and Engineering 283 (2015): 615-635. (Year: 2015).*
Kaul, Vivek, Anthony Yezzi, and Yichang Tsai. "Detecting curves with unknown endpoints and arbitrary topology using minimal paths." 2011. IEEE Transactions on Pattern Analysis and Machine Intelligence 34.10 (2011): 1952-1965. (Year: 2011).*
Zukerman, M. Considering Costand Network Survivability in laying telecommunications cables. Mar. 15, 2016. Paper presented at 16th Anniversary Celebration—Seminars of Faculty of Information Technology, Macao. (Year: 2016).*
Ardelean, Mircea, and Philip Minnebo. "HVDC submarine power cables in the world." Joint Research Center (2015). (Year: 2015).*
Person, Roland, Yannick Aoustin, Jerome Blandin, Jean Marvaldi, and Jean-Franois Rolin. "From bottom landers to observatory networks." 2006. Annals of Geophysics, vol. 49, N. 2/3, Apr./Jun. 2006 (Year: 2006).*
Zukerman, Moshe. Considering Cost and Network Survivability in Laying Telecommunications Cables, Mar. 15, 2016 (Year: 2016).*
Worzyk, Thomas. "Submarine power cables. Design, installation, repair, environmental aspects." (2009). (Year: 2009).*
Kaul, Vivek, Anthony Yezzi, and Yichang Tsai. "Detecting curves with unknown endpoints and arbitrary topology using minimal paths." 2011. IEEE Transactions on Pattern Analysis and Machine Intelligence 34.10: 1952-1965 (Year: 2011).*
Zhao, Mingbo, et al. "Route selection for cabling considering cost minimization and earthquake survivability via a semi-supervised probabilistic model." (2016) IEEE Transactions on Industrial Informatics 13.2: 502-511 (Year: 2016).*
Allan, P. "Hydrographic information and the submarine cable Industry." 2001. Special Publication-Hydrographic Society 42: Paper-26. (Year: 2001).*
Z. Wang et al., "A Seismic Resistant Design Algorithm for Laying and Shielding of Optical Fiber Cables", IEEE/OSA Journal of Lightwave Technology, val. 35, No. 14, pp. 3060-3074, Jul. 2017.

* cited by examiner

SYSTEM AND METHOD FOR DETERMINING OPTIMAL PATH ARRANGEMENTS FOR AN INFRASTRUCTURE LINK WITH TERRAIN SLOPE CONSIDERATION

TECHNICAL FIELD

The present invention relates to a system and method for determining optimal path arrangements for an infrastructure link with terrain constrain. More particularly, although not exclusively, the invention relates to a system and method for determining one or more optimal paths in uneven terrain, taking into account the slope of the geographic terrain in which the path is arranged.

BACKGROUND

Optical fiber long-haul telecommunication cables are crucial to modern society in transmitting information to supply burgeoning demand in the increasingly interconnected world. On one hand, investments in long-haul optical fiber cables have a significant impact on the economy; on the other hand, breakage or faults of such cables caused by various hazards such as earthquakes can lead to severe social and economic consequences. It is therefore preferable to incorporate disaster mitigation into the cable route planning and design phase with the aim of avoiding such problems ab initio.

Path planning is a procedure of selecting the route for laying the cable. The path of a cable affects its construction cost, and the breakage risk of the cable is strongly related to the location of the able. Both natural hazards and human activities may damage the cables. In view of the high cost involved, it is desirable to improve the survivability of the cables, as well as the survivability of the vehicles laying the cables. Various approaches may be to design the path of the cable to avoid high risk or highly uneven areas, bury the cable under the seabed, and adopt cables with strong protection such as single armoured cable, double armoured cable and rock armoured cable. However, a higher protection level requires a more expensive material, this results in higher construction cost per unit cable length.

SUMMARY OF THE INVENTION

In the light of the foregoing background, it is an object to address the above needs, to overcome or substantially ameliorate the above disadvantages or, more generally, to provide a system and method for determining optimal path arrangements for an infrastructure link.

Accordingly, the present invention, in a first aspect provides a method for determining optimal path arrangements for an infrastructure link between two geographic locations, comprising: modelling a geographic terrain containing the two geographic locations; optimizing an arrangement cost and a repair rate for two or more potential paths based on the modelled geographic terrain, an arrangement cost model, and a repair rate model, taking into account at least two design levels, wherein the arrangement cost model incorporates direction-dependent factor and direction-independent factor associated with the path arrangements; and determining the optimal path arrangements each including multiple path portions and respective design levels associated with the path portions based on the optimization.

Preferably, the modelling of the geographic terrain comprises modelling the geographic terrain into a grid with multiple grid points.

Preferably, the geographic terrain is modelled such that each point on the model is denoted by a 3D coordinate including altitude of the geographic location.

More preferably, the method further comprises receiving input associated with dimensions of the grid points for modelling the geographic terrain.

Additionally, the method further comprises receiving input associated with the two geographic locations.

Additionally, the method further comprises displaying at least one of the optimized path arrangements on a map of the geographic terrain.

Preferably, the arrangement cost model incorporates a factor associated with location and design level of the path.

More preferably, the arrangement cost model incorporates a factor associated with location and design level of the path.

Most preferably, the direction-dependent factor comprises: direction of the path or slope of the geographic terrain in which the path is arranged.

Most preferably, the direction-independent factor comprises: labor, licenses, or protection level.

Additionally, the method further comprises receiving input associated with the direction-dependent factor and direction-independent factor.

According to an example of the preferred embodiments, the arrangement cost model incorporates the factor associated with location and design level of the path for each portion of a path, and sums the arrangement cost per unit length of a path to determine an arrangement cost of the path.

According to an example of the preferred embodiments, the repair rate model is based on spatially distributed ground motion intensity associated with the geographic terrain in which the path is arranged.

Preferably, the spatially distributed ground motion intensity comprises peak ground velocity.

According to another example of the preferred embodiments, the repair rate model is based on spatially distributed ground motion intensity associated with the geographic terrain of each portion of a path and sums the repair rate per unit length of a path to determine a repair rate of the path.

Additionally, the optimization in the method for determining optimal path arrangements comprises calculating a minimum weighted cost value over all design levels for each point on the modelled geographic terrain.

Preferably, the optimization further comprises transforming the optimization to a Hamilton-Jacobi-Bellman equation based on the calculated minimum weighted cost value; and applying Ordered Upwind Method to solve the Hamilton-Jacobi-Bellman equation for determining the optimal path arrangements.

In addition, the method for determining the optimal path arrangements comprises determining a set of Pareto optimal solutions representing the optimal path arrangements.

In one specific implementation, the infrastructure link comprises a cable and the optimal path arrangements are optimal laying paths.

Preferably, the cable is an optical cable.

Alternatively, the cable is a sub-marine cable.

In a second aspect, the present invention is an information handling system for determining optimal path arrangements for an infrastructure link between two geographic locations, comprising: one or more processors arranged to: model a geographic terrain containing the two geographic locations; optimize an arrangement cost and a repair rate for two or more potential paths based on the modelled geographic terrain, an arrangement cost model, and a repair rate model, taking into account at least two design levels, wherein the arrangement cost model incorporates direction-dependent factor and direction-independent factor associated with the path arrangements; and determine the optimal path arrangements each including multiple path portions and respective design levels associated with the path portions based on the optimization; a display arranged to display the determined optimal path arrangements. The system may further include input devices or means for receiving user input. Preferably, the system is further arranged to perform the method of the first aspect. The infrastructure link may be a submarine cable, fluid pipeline (e.g., oil, water, and gas pipes), electric power cables, electric data cables, optical cables, etc.

In a third aspect, the present invention is a non-transitory computer readable medium for storing computer instructions that, when executed by one or more processors, causes the one or more processors to perform a method for determining optimal path arrangements for an infrastructure link between two geographic locations, comprising: modelling a geographic terrain containing the two geographic locations; optimizing an arrangement cost and a repair rate for two or more potential paths based on the modelled geographic terrain, an arrangement cost model, and a repair rate model, taking into account at least two design levels, wherein the arrangement cost model incorporates direction-dependent factor and direction-independent factor associated with the path arrangements; and determining the optimal path arrangements each including multiple path portion. Preferably, the non-transitory computer readable medium is further arranged to perform the method of the first aspect. The infrastructure link may be a submarine cable, fluid pipeline (e.g., oil, water, and gas pipes), electric power cables, electric data cables, optical cables, etc.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Embodiments of the present invention will now be described, by way of example, with reference to the accompanying drawings in which.

DETAILED DESCRIPTION OF THE PREFERRED EMBODIMENT

Path Optimization for Infrastructure Links

The invention relates to path optimization for an infrastructure link between two locations on the Earth's surface that crosses uneven terrain which hinders the stability of cable laying vehicle (or remotely operated vehicle) as it buries the cable.

In one embodiment, the focus is on path optimization of infrastructure links, in particularly, submarine cables, where the terrain is having uneven slope. Preferably, the problem can be formulated as a multi-objective optimal control problem and the objective is to find the set of Pareto optimal paths for the infrastructure link with two objective functions—to minimize the laying cost associated with the laying of the infrastructure link and to minimize the number of potential failures (hence repairs) along the infrastructure link.

Figure 1:
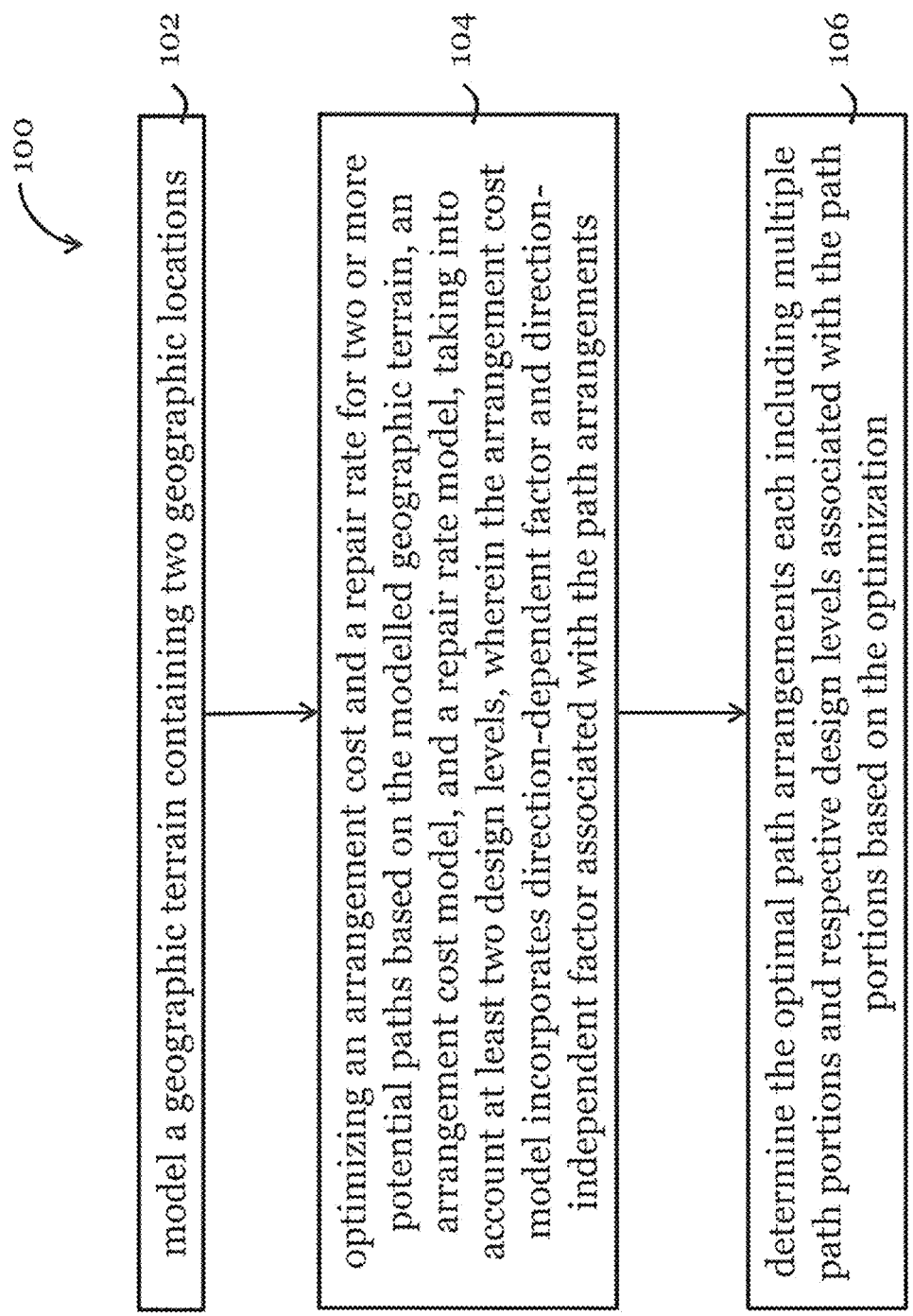
FIG. 1 a flow diagram illustrating a method for determining optimal path arrangement for an infrastructure link in one embodiment of the invention.

FIG. 1 shows a method 100 for determining optimal path arrangements for an infrastructure link between two geographic locations. The method 100 comprises a step of modelling a geographic terrain containing the two geographic locations 102. The modelling of the geographic terrain in the present embodiment may be built on the state of the art in geographic information systems (GIS) for terrain approximation. GIS based path selection approaches digitize geographic data and represents the surface of the Earth by a graph. Multiple factors affecting cable path planning are considered through a summary cost which is a sum of the weighted costs of each of the factors.

The method 100 further comprises a step 104 to optimize an arrangement cost and a repair rate for two or more potential paths based on the modelled geographic terrain in step 102, an arrangement cost model, and a repair rate model while taking into account of at least two design levels, where the arrangement cost model incorporates direction-dependent factor and direction-independent factor associated with the path arrangements. The direction-dependent factor may comprises direction of the path or slope of the geographic terrain in which the path is arranged, and the direction-independent factor may comprises labor, licenses, or protection level.

In this embodiment, the two objective functions—arrangement cost and repair rate are considered. The first objective function may include the laying cost and the construction cost. For brevity, thereafter, the term arrangement cost used herein refers to mainly to laying cost. The laying cost is applicable to, for example, burying a submarine cable under the seabed. The second objective function is an index associated with the estimation of future number of repairs (or failures) of the link in a given time period (e.g., 100 years). Although the first objective is about cost incurred during construction, the second objective is about cost incurred in the (potentially, long term) future.

Factors associated with the estimation of the arrangement cost include the length of the link, location (with different terrain slope), requirement for security arrangements, licensing, etc. As an example in this embodiment, the arrangement cost increases enormously when the ROY rolls over in uneven terrain. Whereas the repair rate (failure rate) indicates both potential costs of repairs, as well as link downtime that may have significant societal cost. To calculate the total number of repairs for a link, the term repair rate is used to indicate the predicted number of repairs per unit length of the link over a fixed time period into the future.

While the capital cost of laying a cable is a crucial factor in the overall costs of cable networks, resilience to a range of risks is also important. Both natural hazards and human activities may damage submarine cables. Natural hazards that may damage cables include volcanic activities, tsunamis, landslides and turbidity currents, while human activities in the ocean, such as fishing, anchoring and resource exploration activities also pose a major threat to the safety of submarine cables. It is shown that over 65% of all cable faults occurring in water depths less than 200 m result from human activities.

In order to improve the survivability of submarine cables, various approaches include but not limit to designing the path of the cable to avoid high risk areas, adopting cables with strong protection, and burying the cable under the seabed. As an example, to protect a cable from being damaged by human activities, plough burial operation carried out by a remotely operated vehicle (ROV) is usually performed in water depths of less than 1000 m where seabed conditions allow.

Path planning, a procedure of selecting the route for laying the cable, is an important part of constructing a submarine cable system. The path of a cable affects its construction cost, and the breakage risk of the cable is strongly related to the location of the cable. High slopes increase the propensity of the ROV to topple over as it buries the cable, and so the slope of the terrain needs to be considered during the path planning procedure. It is suggested by the International Cable Protection Committee (ICPC) that the planned path does not violate any of these conditions:

≤6° for side slopes (i.e., the slope in the direction of the path) in buried areas (depending on seabed composition)
≤15° for slopes perpendicular to the route in buried areas
≤25° for slopes perpendicular to the route in surface lay areas The present invention, therefore, also takes into consideration of the terrain slope for submarine cables as a multi-objective optimal control problem.

The method 100 further comprises a step 106 to determine the optimal path arrangements each including multiple path portions and respective design levels associated with the path portions based on the optimization. In the present embodiment, the method 100 for determining the optimal path can be approached by converting the multi-objective optimal control problem into a single objective optimal control optimization problem by applying weights to each objective. Pareto optimal path can be obtained by solving the single objective optimal control problem using Ordered Upwind Method (OUM). The method 100 in the present invention also considers non-homogenous cables (i.e. segments of cables at more than one design levels) and the stability of remotely operated vehicle (ROV) in path planning as a function of both the side slope and the slope perpendicular to the path direction.

Modelling

Models are for designing the path and selecting the design level of each point on the path of a cable between the starting node and the destination along the Earth's surface or buried in shallow ground or under seabed. Three models are described below.

In the below models, D denotes a closed and bounded path-connected region on the Earth's surface, and U denotes the set of possible design levels of the cable. The function u: D→U represents the design level: u(x) is the required design level at x∈D based on issues such as earthquake risk, etc. Without loss of generality, the set U of available design levels is assumed to be the same for any point x∈D. Path is designed to select the design level of each point on the path of a cable γ∈D between the Start Point A∈D and the End Point B∈D. Curves in D are assumed parameterized according to the natural parametrization, i.e., parameterizing a curve γ as a function of arc length denoted by s, so that a curve γ: [0; l (γ)] →D is a function from the interval [0; l (γ)], taking values in D, where l (γ) is the length of the curve. This apparently circuitous definition is not to be a problem in practice because of the method used to find such curves. A path (curve) and corresponding design levels are obtained such that γ (0)=A, γ (l(γ))=B. Below detailed the landform model, laying cost, and the expected number of potential required repairs.

A. Earth's Surface Model

In this embodiment, the Earth's surface is approximated by using a triangulated piecewise-linear two-dimensional manifold M in $R^3$. Each point on M is represented by three-dimensional coordinates (x, y, z), where $z=\xi(x, y)$ is the altitude of geographic location (x, y).

B. Laying Cost Model

As mentioned, the laying cost of submarine cables not only depends on the local site attributes (soil type, elevation, etc.), labor, licenses (e.g. right of way) and protection level, but also depends on the direction of the path. The laying cost consists of two components: (1) a direction-dependent laying cost that depends on the direction of the path and the slope of the terrain in order to account for instability risk of the ROV; (2) a direction-independent laying cost that encompasses all other costs, such as labor, licenses and protection level mentioned above. In this embodiment, let $a:R+\to A$, where $A=\{a\in T_x(M)|\|a\|=1\}$ define the direction in which the ROV is facing, where $T_x(M)$ is the tangent space of the manifold M at the point $x \in M$. Note that $\dot{\gamma}$ (s)=a(s), s≥0 by our definition. The set of admissible controls describe the direction of a path is defined $A=\{a(\cdot):R+\to A|a(\cdot)$ is piecewise continuous$\}$. Redefine $u:R+\to U$ by the natural parametrization of a path, where U is the set of the available design levels. The set of admissible design levels for a cable is defined $U=\{u(\cdot):R+\to U|u(\cdot)$ is piecewise constant$\}$.

For any point $x=(x, y, z)\in M$; $z=\xi(x, y)$, we use h(x; a; u) to represent the laying cost per unit length, if the direction of the path is $a=(\dot{x}; \dot{y}; \dot{z})\in A$ and the design level is $u\in U$. Note that +

$$\dot{z} = \frac{\partial z}{\partial x}\dot{x} + \frac{\partial z}{\partial y}\dot{y}$$

since x∈M, where $$\frac{\partial z}{\partial x}, \frac{\partial z}{\partial y}$$

is the slope gradient vector at x.

To consider instability risk to the ROV caused by terrain slope, the direction-dependent laying cost is modeled as follows. Let $$n = \left(\frac{\partial z}{\partial x}; \frac{\partial z}{\partial y}; -1\right)$$

denote the normal vector at the point x on the surface $z=\xi(x, y)$. The slope in the direction of the path (i.e., side slope) is represented by $$q_1(x, a) = \frac{\|\dot{z}\|}{\sqrt{\dot{x}^2 + \dot{y}^2}}. \quad (1)$$

For the path direction a and the normal vector n at the point x, the slope perpendicular to the path is $$q_2(x, a) = \frac{\|(n \times a)_3\|}{\|(n \times a)_{12}\|} = \frac{\left|\frac{\partial z}{\partial x}\dot{y} - \frac{\partial z}{\partial y}\dot{x}\right|}{\sqrt{\left(\frac{\partial z}{\partial y}\dot{z} + \dot{y}\right)^2 + \left(\frac{\partial z}{\partial x}\dot{z} + \dot{x}\right)^2}}, \quad (2)$$

where × represents cross product, $(\bullet)_3$ and $(\bullet)_{1a}$ represent the third component and the first two components of the resulting vector, respectively.

To incorporate the two considerations of the side slope and the slope perpendicular to the path, an exponential function is used to model the direction-dependent part of the cable laying cost related to terrain slopes which is defined as follows, $$h_1(x, a) = e^{q_1(x,a) - \theta_1} + e^{q_2(x,a) - \theta_2}, \quad (3)$$

where $\theta_1 \in R_+$, $\theta_2 \in R_+$ are two thresholds represent the allowable maximum side slope and the slope perpendicular to the path. The use of the exponential function provides a steep penalty for failure to remain within the bounds prescribed for slopes. An alternative may be to have a sharp cut-off penalty but the present approach using (3) appears to work well.

Inclusion of the direction-independent component $h_2(x, u)$ gives the unit-length laying cost function $h(x, a, u)$ as $$h(x,a,u) = h_1(x,a)h_2(x,u). \quad (4)$$

Observe that this cost function depends both on location of the path and on the direction of the path. The unit-length laying cost function $h(x, a, u)$ is assumed to be continuous and that it satisfies $h(x, a, u) > 0$ for all $x \in M$, $a \in A$ and $u \in U$, the non-continuous case of h is discussed later.

As discussed, a cable is to be laid, represented by a Lipschitz continuous curve γ to connect Start Point A and End Point B in M. The total laying cost of the cable γ with the controls of path direction $a(\bullet) \in A$ and design levels $u(\bullet) \in U$ is represented by $H(\gamma, a(\bullet), u(\bullet))$. Applying the additive assumption of the laying cost, $H(\gamma, a(\bullet), u(\bullet))$ can be written as $$\mathbb{H}_{(\gamma,a(\bullet),u(\bullet))} = \int_0^{l(\gamma)} h(\gamma(s),a(s),u(s))ds, \quad (5)$$

where l(γ) is the total length of the cable γ.

C. Cable Repair Model

The term repair rate is used to indicate the predicted number of repairs per unit length of the cable over a fixed time period into the future, which is then extended to include design level variable u. The repair rate at location $x=(x, y, z) \in M$; $z=\xi(x, y)$ is defined as $g(x, u)$; $u \in U$. For the same location x on the cable, the repair rate caused by a disaster is lower if a higher-level design is adopted, and vice versa. The repair rate function $g(x, u)$ is also assumed to be continuous and satisfies $g(x, u) > 0$ for all $x \in M$ and $u \in U$.

Let $G(\gamma, u(\bullet))$ denote the total number of repairs of a cable γ with the selection (or control) of design levels $u(\bullet) \in U$. Again, we assume that $G(\gamma, u(\bullet))$ is additive. That is, $G(\gamma, u(\bullet))$ can be rewritten as $$\mathbb{G}_{(\gamma,u(\bullet))} = \int_0^{l(\gamma)} g(\gamma(s);u(s))ds. \quad (6)$$

As discussed, a higher design level results in a greater direction-independent laying cost and a reduced number of repairs. In other words, $h_2(x, u_1) \leq h_2(x, u_2)$ and $g(x, u_1) \; g(x, u_2)$ if $u_1 < u_2$, if $x \in M$.

Ground motion intensities, such as Peak Ground Velocity (PGV) may be used to calculate the repair rate g taking into consideration the risk caused by earthquakes. Other natural hazards (e.g. landslides, debris flows, volcanoes, storms, hurricanes) that may damage cables can be dealt with in the same way using the laying cost model and cable repair model provided that they are local and additive in nature.

Problem Formulation and Solution

The following provides the detailed mathematical formulation of the link path planning problem and then introduced the methodology of this embodiment. Based on the models of landforms, construction cost, and the potential required repairs, the multi-objective optimization problem of minimizing the construction cost and the total number of repairs is as follows:

$$\min_{a(\cdot),u(\cdot)} \Phi(\gamma, a(\cdot), u(\cdot)), \quad \text{(Problem 1)}$$
$$\text{s.t. } \gamma(0) = A, \gamma(l(\gamma)) = B,$$

where γ is the cable that connects Start Point A and End Point B.

In general, the two objectives, the laying cost and the total number of repairs are conflicting, so it is impossible to simultaneously minimize both. Therefore, a set of Pareto optimal solutions have to be sought.

A common approach to solve multi-objective optimization problem is to reduce it to a single-objective optimization problem, which operates by minimizing a weighted sum of the objectives to recover Pareto optimal solutions. By the weighted sum approach, Problem 1 is converted into a single-objective path planning problem, namely, $$\min_{a(\cdot),u(\cdot)} \Phi'(\gamma, a(\cdot), u(\cdot)) = \int_0^{l(\gamma)} f(\gamma(s), a(s), u(s))ds, \quad \text{(Problem 2)}$$
$$\text{s.t. } \gamma(0) = A, \gamma(l(\gamma)) = B,$$

where $f(\gamma(s), a(s), u(s)) = h(\gamma(s), a(s), u(s)) + c \cdot g(\gamma(s), u(s))$ and $c \in R_+^1 \cup \{o\}$. The assumptions of continuity and non-negativity made for h and g render the weighted cost function $f(\gamma(s), a(s), u(s))$ continuous and non-negative. Since M×A×U is a compact set, there exists $0 < F_{min}, F_{max} < \infty$.

$$F_{min} < f_{min}(X) \leq f(X,a,u) \leq f_{max}(X) < F_{max} \quad (7)$$

For every $(x, a, u) \in M \times A \times U$, where $$f_{min}(x) = \min_{a \in A, u \in U} f(x, a, u), \quad f_{max}(x) = \max_{a \in A, u \in U} f(x, a, u).$$

The following theorem shows that a set of Pareto optimal solutions of Problem 1 can be obtained by solving Problem 2.

Theorem 1

If $(\gamma^*; a^*(\cdot), u^*(\cdot))$ is an optimal solution for Problem 2, then it is Pareto optimal for the laying cost H and the total number of repairs G.

For any point $x \in M$, controls $a(\cdot) \in A$ and $u(\cdot) \in U$, a cost function is defined $\varphi: M \times A \times U \to R_+$ that represents the cumulative weighted cost to travel from the point x to End Point B of a cable $\beta$ as $$\varphi(\beta, a(\cdot), u(\cdot)) = \int_0^{l(\beta)} f(\beta(s), a(s), u(s)) ds, \quad (8)$$

where $\beta \in \text{Lip}([0, +\infty); M)$ is a Lipschitz continuous curve parameterized by its length, $$\|\beta'(x)\| = \left\|\frac{d\beta(s)}{ds}\right\| = 1,$$

$\beta(0)=x$, and $\beta (l(\beta))=B$.

Given the definition of the cost function $\varphi$, the value function $\Phi(x): M \to R+$ that represents the minimal cumulative weighted cost to travel from the point x to End Point B is $$\phi(x) = \min_{a(\cdot), u(\cdot)} \varphi(\beta, a(\cdot), u(\cdot)) = \varphi(\beta^*, a^*(\cdot), u^*(\cdot)), \quad (9)$$

where $\beta^* \in M$, $a^*(\cdot) \varepsilon A$ and $u^*(\cdot) \in U$ are optimal solutions for minimizing $\varphi(\beta, a(\cdot), u(\cdot))$. Evidently, $\Phi(B)=0$.

Regarded as the function that achieves the lowest cost for $x \in M$ to reach End Point B, the value function $\Phi$ satisfies the following continuous Dynamic Programming Principle (DPP).

Theorem 2

For every $s > 0$, $t \geq 0$, such that $0 \leq s + t \leq l(\beta^*)$, $$\phi(\beta(s)) = \min_{a(\cdot), u(\cdot)} \left\{ \int_s^{s+t} f(\beta(\tau), a(\tau), u(\tau)) d\tau + \phi(\beta(s+t)) \right\}. \quad (10)$$

That is, controls $a^*(\cdot)$ and $u(\cdot)$ are optimal between two points if and only if the same controls are optimal over all intermediate points along the curve.

Next, a partial differential equation, namely the Hamilton-Jacobi-Bellman (HJB) equation can be derived from Equation (10) by applying DPP. Let the controls $a^*(\cdot), u^*(\cdot)$ and the curve $\gamma$ be optimal for Problem 2. From Theorem 2, $$\phi(\gamma^*(s)) = \int_s^{s+t} f(\gamma^*(\tau), a^*(\tau), u^*(\tau)) d\tau + \phi(\gamma^*(s+t)). \quad (11)$$

Dividing Equation (11) by t and rearranging, with t tending to 0, gives $$f(\gamma^*(s), a^*(s), u^*(s)) + \frac{\phi(\gamma^*(s+t)) - \phi(\gamma^*(s))}{t} \approx 0. \quad (12)$$

Letting $t \to 0$, the following static HJB equation is obtained, $$\min_{a \in A; u \in U} \{(\nabla \phi(x) \cdot a) + f(x, a, u)\} = 0, \quad x \in M, \quad (13)$$

$$\phi(B) = 0,$$

where • in the above equation denotes the dot product in $R_3$. Once deriving the value function $\Phi$, the optimal controls $a^*$ and $u^*$ can be calculated by $$(a^*, u^*) = \arg\min_{a \in A, u \in M} \{\nabla \phi(\gamma(s)) \cdot a + f(\gamma(s), a, u)\} \gamma(0) = A. \quad (14)$$

Note that if $f(x, a, u) = f(x)$, the weighted cost function $f$ is isotropic and the cable is homogeneous. The optimal control $a^*$ is the direction of steepest descent of $\Phi$, given by $$a^*(x) = -\frac{\nabla \phi(x)}{\|\nabla \phi(x)\|}. \quad (15)$$

As a result, the HJB equation (13) simplifies to the following well known Eikonal equation.

$$\|\nabla \phi(x)\| = f(x), \phi(B) = 0. \quad (16)$$

In this case, the cable path planning Problem 1 has been described as a multi-objective variational optimization problem and solved by Fast Marching Method (FMM).

If $f(x, a, u) = f(x, u)$; that is, the weighted cost function is isotropic but the cable is nonhomogeneous, the optimal control $a^*$ is still the direction of steepest descent of $\Phi$ and the HJB equation (13) is reduced to the following extended Eikonal equation.

$$\|\nabla \phi(x)\| = \min_u f(x, u), \phi(B) = 0. \quad (17)$$

In this case, the cable path planning Problem 1 is solved by a FMM-based method.

On the one hand, the classical solution of Equation (13) that is continuous and differentiable (i.e., $C^1$) everywhere in the entire domain M may not exist even when the weighted cost function, is smooth. On the other hand, weak solutions of Equation (13), which satisfy Equation (13) except for finitely many points in M are known to be non-unique in most cases. Viscosity solutions, that intuitively are almost classical solutions whenever they are regular enough, are defined as weak solutions for which the maximum principle holds when they are compared with smooth functions. Classical solutions are always viscosity solutions. As a natural solution concept to use for many HJB equations representing physical problems, viscosity solutions always exist and are unique and stable. Accordingly, the viscosity solution of Equation (13) is precisely the value function of Equation (10). Generally, the analytic viscosity solution of the HJB equation (13) is difficult to obtain, so a numerical method has to be sought to compute an approximate solution.

In the present invention, Ordered Upwind Method (OUM) is adopted to solve the HJB Equation (13); that is, to obtain an approximation $\bar{\phi}$ of $\Phi$ on the vertices of M. Recall that a triangulated piecewise-linear two-dimensional manifold M is used, consisting of faces, edges, and vertices, in $R_3$ to approximate the Earth's surface. It is further assumed that the triangulated manifold model is complete.

Similar to FMM, the solution based on OUM is built outwards from B with $\bar{\phi}$ (B)=0. The vertices on M are classified into three categories, "Far, Considered, and Accepted". In the procedure of OUM, the status of vertices can only change from Far to Considered or from Considered to Accepted. In addition, AcceptedFront is defined to be the set of frontier Accepted vertices that neighbor some Considered vertices. For each pair of neighboring vertices $x_j$ and $x_k$ on the AcceptedFront, if there is a Considered vertex $x_i$ neighboring both $x_j$ and $x_k$, then the line segment $x_ix_k$ belongs to the set called AF. The near front (NF) with respect to each Considered vertex x is defined as $$NF(x)=\{x_jx_k \in AF | \exists \tilde{x} on x_jx_k s.t. \|\tilde{x}-x\| \leq \upsilon Y\}, \quad (18)$$

where $\upsilon$ is the diameter of the triangulated mesh (i.e., if the vertices $x_j$ and $x_k$ are adjacent, then $\|x_j-x_k\| \leq \upsilon$), and $$\gamma = \frac{\max f(x, a, u)}{\min f(x, a, u)}.$$

The OUM uses a semi-Lagrangian scheme where the control is assumed to be held constant within each triangle. To update the value function $\bar{\phi}$ of the considered point x, let $x_j, x_k \in NF(x)$ be two adjacent vertices, whose value functions $\bar{\phi}(x_j)$, $\bar{\phi}(x_k)$ are known. Based on the first-order approximation of Equation (10), the upwinding approximation for $\Phi(x)$ from a "virtual triangle" $X_jXX_k$ can be defined as:

$$\phi'_{x_j,x_k}(x) = \min_{\zeta \in [0,1]; u \in U} \{\tau(\zeta)f(x, a_\zeta, u) + \zeta\bar{\phi}(x_j) + (1-\zeta)\bar{\phi}(x_k)\}, \quad (19)$$

where $\tau(\zeta)=\|(\zeta x_j+(1-\zeta)x_k)-x\|$ is the distance between vertex x and the interpolation point $\zeta x_j+(1-\zeta)x_k$, and the direction vector $$a_\zeta = \frac{\zeta x_j + (1-\zeta)x_k - x}{\tau\zeta}.$$

Golden Section Search can be used to solve the minimization problem 6 in Equation (19). The value function $\bar{\phi}(x)$ at x is then obtained by $$\bar{\phi}(x) = \min_{x_jx_k \in NF(x)} \phi'_{x_j,x_k}(x). \quad (20)$$

Note that $\Phi X_j, X_k (X)$ is defined even when $X_j$ and $X_k$ are not adjacent to X. The OUM-based algorithm for Problem 2 is summarized as Algorithm 1. As discussed above, by setting different values of c in Problem 2, different Pareto optimal solutions of the laying cost and the total number of repairs can be obtained. An approximate Pareto front can be generated from the set of obtained Pareto optimal solutions.

ALGORITHM 1

Algorithm 1 - Algorithm for path planning in the region of interest $\mathbb{D}$.

Input: Region $\mathbb{D}$ (modeled as $\mathbb{M}$), laying cost model h and repair rate model g on $\mathbb{D}$, mesh size $\Delta_x$, $\Delta_y$, Start Point A, End Point B, c, step size $\tau$;

Output: Path $\gamma$ with minimum weighted cost;

1: Discretize $\mathbb{D}$ rectangularly with $\Delta_x$ in x and $\Delta_y$ in y, and denote the set of points on the grid by $\Gamma$;
2: Create edges, faces and obtain a complete triangulation (i.e., $\mathbb{M}$) of $\mathbb{D}$ based on $\Gamma$;

ALGORITHM 1-continued

3: Initialize the labels of all the vertices in $\Gamma$ except Start Point A as Far. Label Start Point A as Accepted;
4: Label all the vertices $x \in \Gamma$ adjacent to Start Point A as Considered and update their values by Equation (20); Let $\bar{x} = \text{argmin}_{x \in \Gamma, x \text{ is Considered}} \bar{\phi}(x)$.
5: Label x as Accepted and update the AcceptedFront.
6: Label the Far vertices neighbouring to x as Considered and update their values by Equation (20).
7: For each other Considered x such that $\bar{x} \in NF(x)$, update its value by $$\bar{\phi}(x) \triangleq \min\{\bar{\phi}(x), \min_{\bar{x}x_i \in NF(x)} \bar{\phi}_{\bar{x},x_i}(x)\}. \quad (21)$$

8: If there is Considered vertex, then go to Step 5.
9: Let $\gamma(0) = B$ and $k = 0$.
10: while $\|\gamma(k) - A\|^2 > \varepsilon$ do
11: Compute the gradient $\nabla\phi(\gamma(k))$ using finite-difference from the obtained value function $\bar{\phi}$;
12: Compute the optimal controls a* and u* by solving Equation (14);
13: Compute $\gamma(k + 1) = \gamma(k) - T\nabla\phi(\gamma(k))$, where $\gamma(k)$ is an approximation of $\gamma(t)$ at time $t = k\tau$.
14: end while
15: return $\gamma$.

The solution $\bar{\phi}$, produced by the above OUM-based algorithm, is proved to converge to the viscosity solution 4, of the HJB equation (13) as the grid step size tends to zero given the assumption of continuity of the laying cost function h and the cable repair rate function g. Note that when the laying cost function h and the cable repair rate function g are not continuous (for example, the design level u is a discrete variable), no proof of convergence currently exists. Nonetheless, OUM still appears to work correctly in examples and apparently also in the result.

To obtain an approximate optimal path, a minimization problem (14) is solved for a* and u* (replacing $\Phi$ with $\bar{\phi}$ computed by the OUM) each time the path exits its current triangle and enters a new adjacent triangle. The path is not restricted to the edges of the mesh and is found from $\gamma(0)=A$, and is completed when End Point B is reached. The computational complexity of OUM is $$O\left(\frac{F\max}{F\min} N\log N\right),$$

where N is the number of vertices in the mesh M.

Applications

This section illustrates the applications of Algorithm 1 to two 3D realistic scenarios. To explicitly show how the instability risk affects the path of a cable, in the first scenario, only the minimization of laying cost is considered when designing the path of the cable between two nodes. It is assumed that there is only one design level in the first scenario. Additionally, the resulted path of the OUM-based algorithm is compared with that of the FMM-based algorithm.

In the second scenario, both the laying cost and the total number of repairs are minimized taking into account instability risk. Without loss of generality, it is assumed that there are two design levels in this scenario: Level 1 (low level)—without any protection and Level 2 (high level)—with protection by cable shielding. In the second scenario, considering the tradeoff between the laying cost and the total number of repairs, the Pareto optimal solutions are obtained and the corresponding approximate Pareto front is generated.

A. The First Scenario

Figure 2:
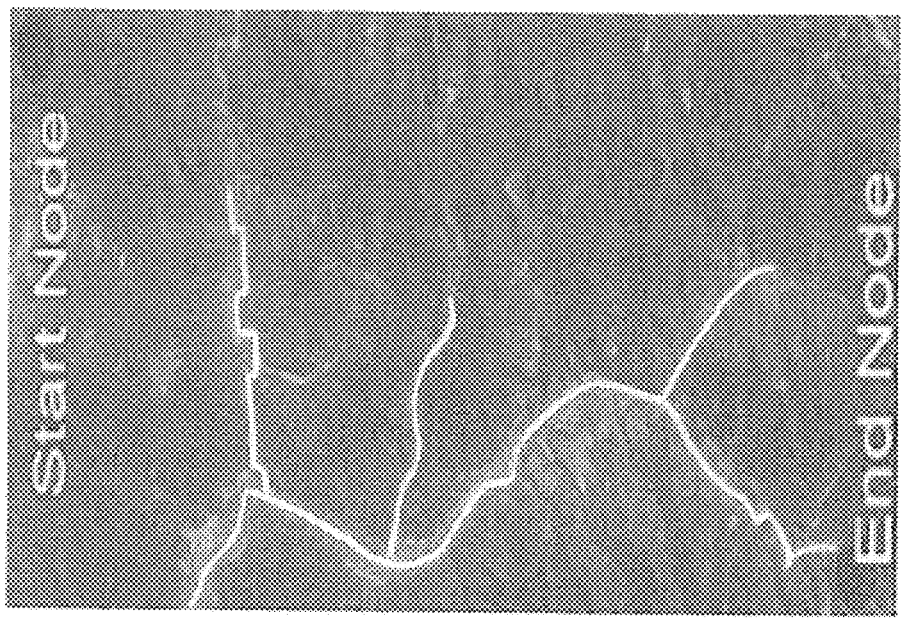
FIG. 2 is a map showing an exemplary region D1, wherein the white line illustrates a stream watershed.

FIG. 2 shows a map of an exemplary region D1, which is located in central Taiwan from northwest (23:900° N, 120.850° E) to southeast (23:500'N, 121.000° E). The red white line illustrates the Chenyoulan Stream Watershed. A cable is laid to connect Start Point (23:897° N, 120.975° E) with End Point (23:501° N, 120.851° E) as shown in FIG. 2.

Figures 3A, 3B:
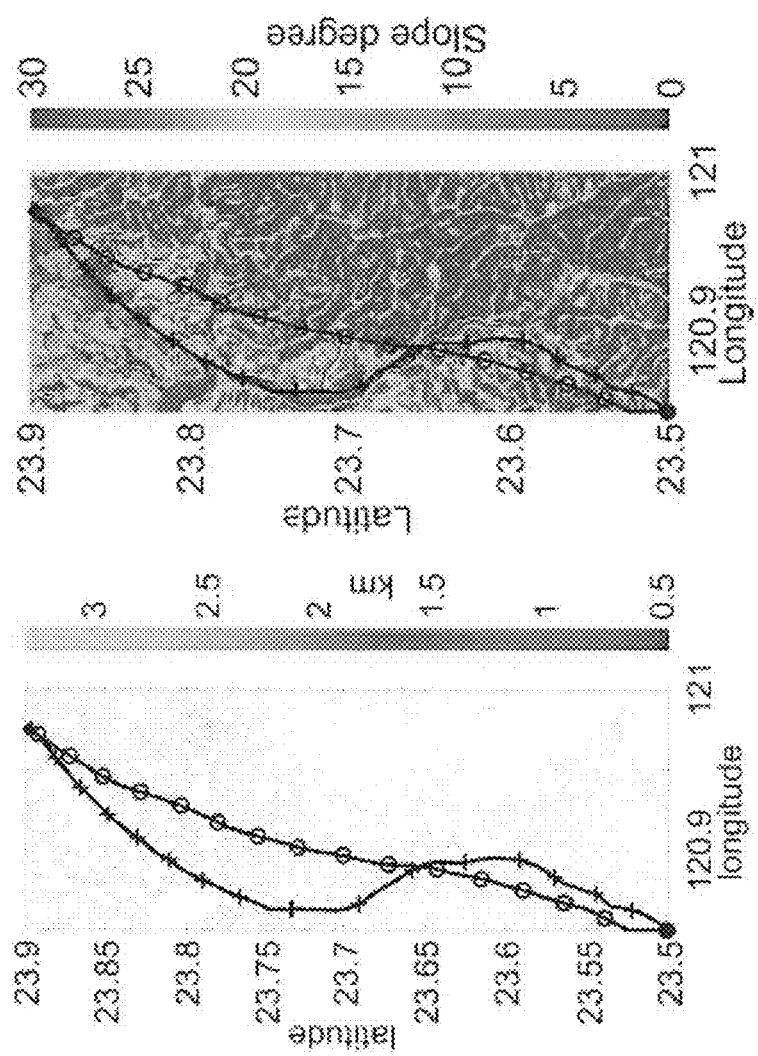
FIG. 3A is a contour map of region D1, wherein the curve marked by pluses indicates the path obtained by the OUM-based algorithm, and the curve marked by circles indicates the path obtained by the FMM-based method.
FIG. 3B is a slope map of region D1, wherein the curve marked by pluses indicates the path obtained by the OUM-based algorithm, and the curve marked by circles indicates the path obtained by the FMM-based method.

FIGS. 3A and 3B are a contour map and a slope map of region D1 respectively, and are calculated using elevation data of the region D1 from FIG. 1. The elevation data of the region D1 were downloaded from the NASA Shuttle Radar Topographic Mission (SRTM). The resolution of the elevation data is 3 arc-second (approximate 90 m) in both longitude and latitude.

In this scenario, the thresholds for the side slope and the slope perpendicular to the path are set to be 6° and 15°, respectively. As mentioned above, only the laying cost of the path is minimized and there is only one design level in this scenario.

Alternatively, $$g(x,u)=0, h(x,a,u)=e^{q1(x,a)-\theta_1}+e^{q2(x,a)-\theta_2}+h_2(x,u).$$

where $\theta_1=\tan 6°$ and $\theta_2=\tan 15°$. Without loss of generality, we set $h_2(x, u)=1$.

In FIG. 3A, the curve marked by pluses indicates the path obtained by the OUM-based algorithm, and the curve marked by circles indicates the path obtained by the FMM-based method. The laying costs corresponding to the two paths are 142.569 and 150.479 while their lengths are 49.992 km and 47.752 km, respectively. Notice that although the path obtained by OUM-based algorithm is longer, it traverses the watershed to avoid the areas with high slope as much as possible, and therefore it incurs lower laying cost than the path obtained by the FMM-based method.

B. The Second Scenario

Figure 4:
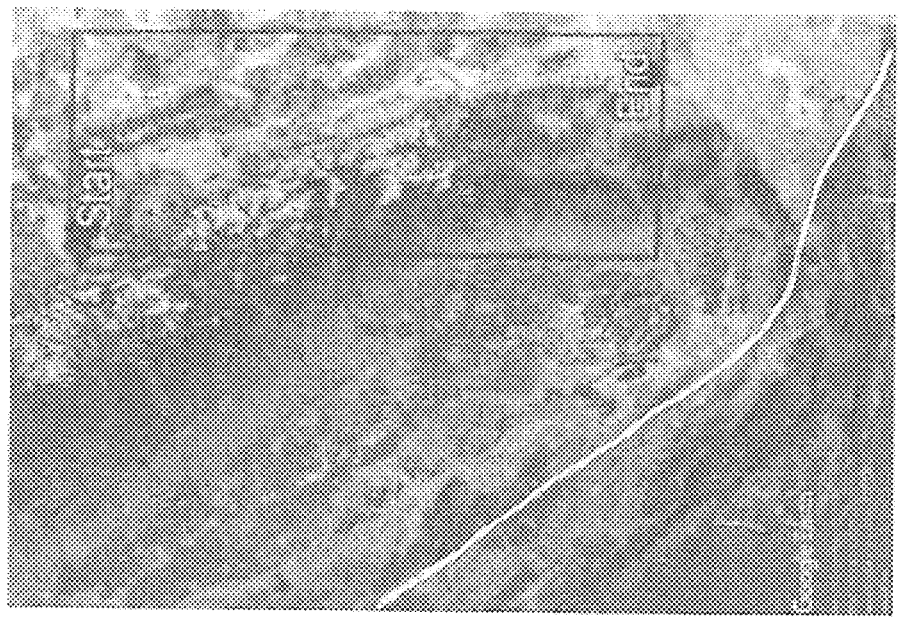
FIG. 4 a map showing an exemplary region D2, wherein the blue rectangular indicate the region D2 and the white line illustrates a fault line.

FIG. 4 shows a map of an exemplary region D2 as indicated by the blue rectangular, which is located in State of California and Nevada, from northwest (38:000° N, −119:000° E) to southeast (35:500° N, −117:700° E). The white line illustrates the San Andreas fault line. A cable is laid from Start Point (37:900° N, −118:900° E) to End Point (35:600° N, −117:950° E) as shown in FIG. 4. In this scenario, $\theta_1$ is set to be 6° and $\theta_2$ is set to be 11°.

Figures 5A, 5B:
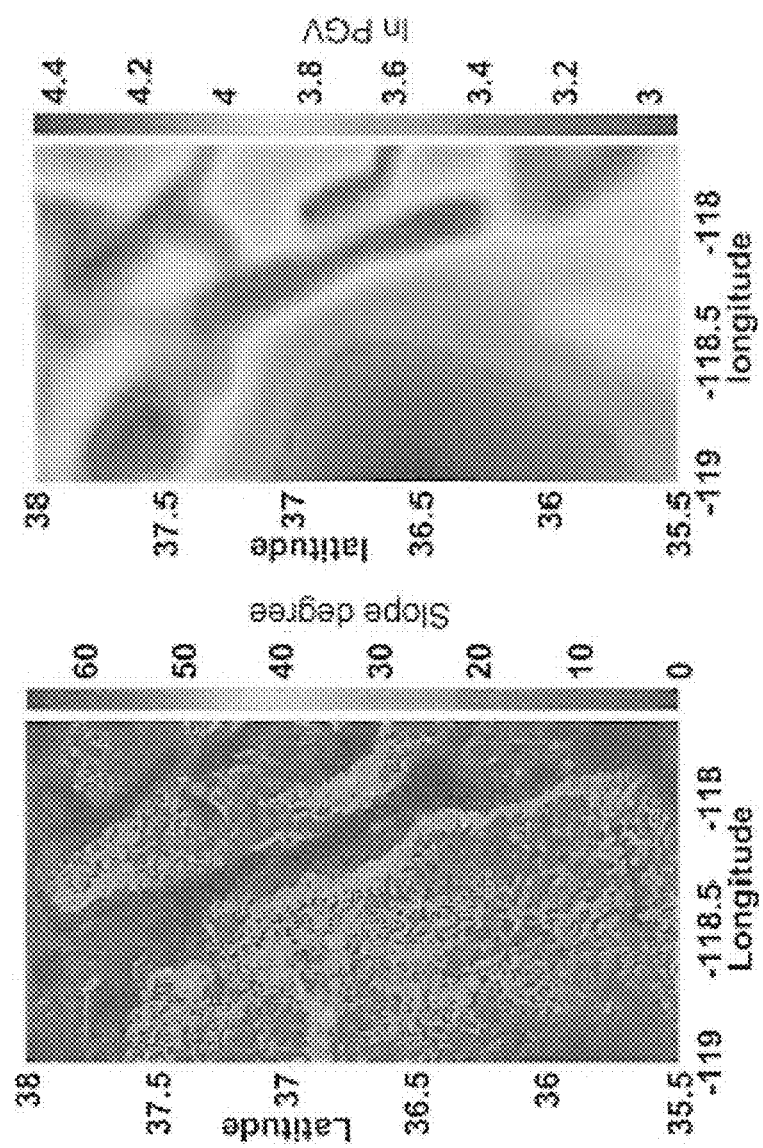
FIG. 5A is a slope map of region D2.
FIG. 5B is a shaded surface map of Peak Ground Velocity (PGV) for region D2 in log scale.

FIG. 5A shows a slope map of region D2, and FIG. 5b shows a shaded surface map of Peak Ground Velocity (PGV) for region D2 in log scale. Again, the elevation data (with 3 arc-second resolution) of the region D2 were downloaded from SRTM. To evaluate the earthquake induced breakage risk of the cable, Peak Ground Acceleration (PGA) data of the region D2 were downloaded from United States Geological Survey (USGS). The spatial resolution of the PGA data is 180 arc-second. The elevation data was downsampled and the PGA data interpolated to generate the same spatial resolution: 30 arc-second elevation data and PGA data. For calculating the total number of repairs of the cable, PGA can be converted to PGV as follows, $$\log_{10}(\upsilon)=1.0548 \log_{10}(PGA)-1.5566, \quad (22)$$

where $\upsilon$(cm/s) represents the PGV value.

FIGS. 6A, 6B, 6C, 6D, 6E and 6F are Pareto optimal paths modelled on the PGV map of region D2 obtained by the OUM-based algorithm, where $H(\gamma^*, a(\cdot), u^*(\cdot))$ and $G(\gamma^*, u^*(\cdot))$ denote the laying cost and total number of repairs, respectively. In each of the FIGS. 6A-6F, the logarithmic PGV map is shown on the left and the slope map is shown on the right, where magenta lines indicate the cable or cable segments adopting Level 1 and the black lines indicate the cable or cable segments adopting Level 2.

The corresponding data collected from each of the Pareto optimal paths in FIGS. 6A-6F, including the laying cost $H(\gamma^*, a(\cdot) u^*(\cdot))$ and total number of repairs $G(\gamma^*, u^*(\cdot))$ are shown in Table I.

TABLE I

|   | c   | $\mathbb{H}(\gamma^*, a(\cdot), u^*(\cdot))$ | $\mathbb{G}(\gamma^*, u^*(\cdot))$ |
|---|-----|-----------|---------|
| a | 0   | 772.4504  | 46.6757 |
| b | 3.2 | 806.3512  | 31.3214 |
| c | 11  | 900.1517  | 20.9815 |
| d | 22  | 1082.1358 | 9.3630  |
| e | 45  | 1146.4565 | 6.1245  |
| f | 570 | 1200.7766 | 5.0165  |

Table I shows the trade-off between the laying cost and the total number of repairs. In order to obtain the approximate Pareto front of the two objectives, the weighting value c may be varied from 0 to 900. As the weight value c increases, the laying cost also increases and total number of repairs decreases.

Figure 6A:
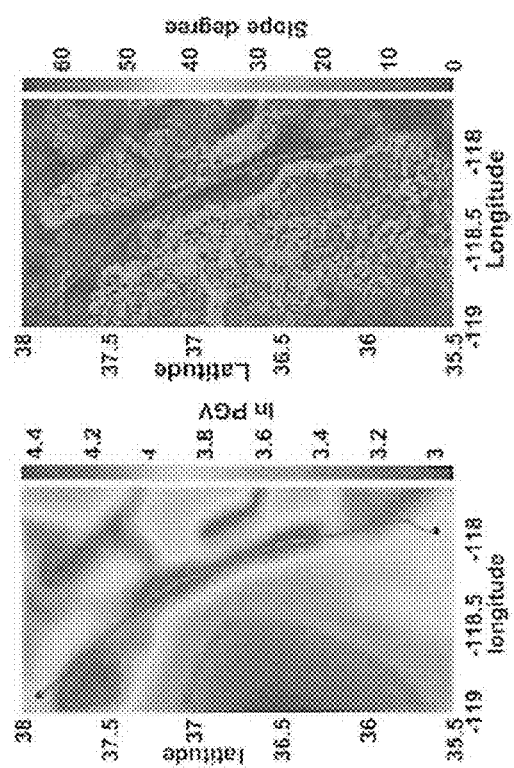
FIGS. 6A, 6B, 6C, 6D, 6E and 6F are Pareto optimal paths modelled on the PGV map of region D2, where the magenta lines indicate the cable or cable segments being adopted at a first design level, and the black lines indicate the cable or cable segments being adopted at a second design level.
Figure 6B:
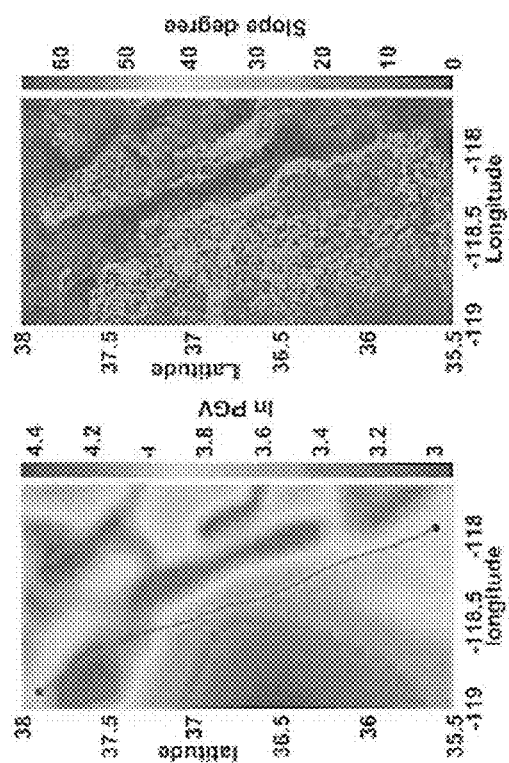
Figure 6C:
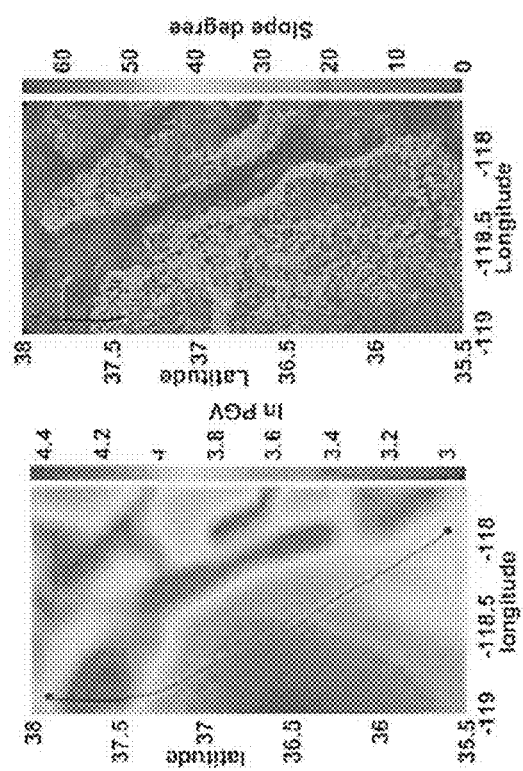
Figure 6D:
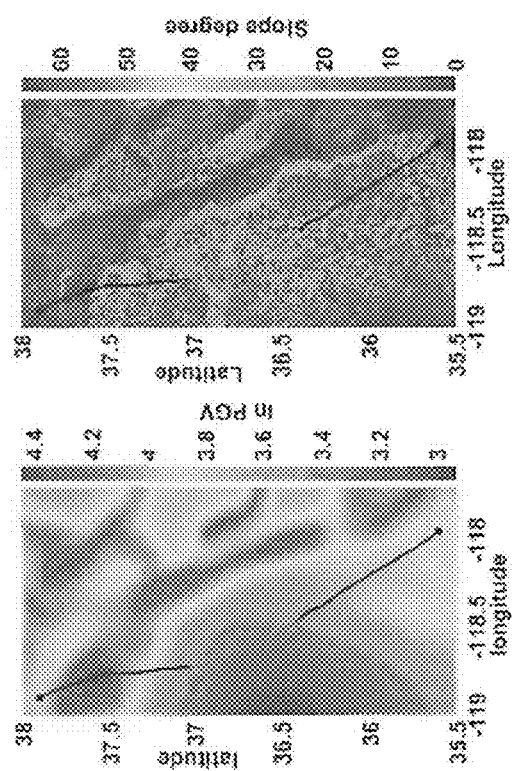
Figure 6E:
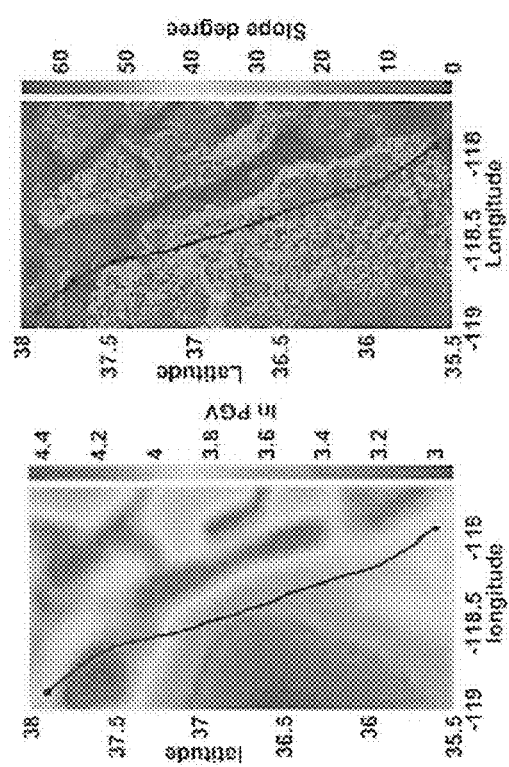
Figure 6F:
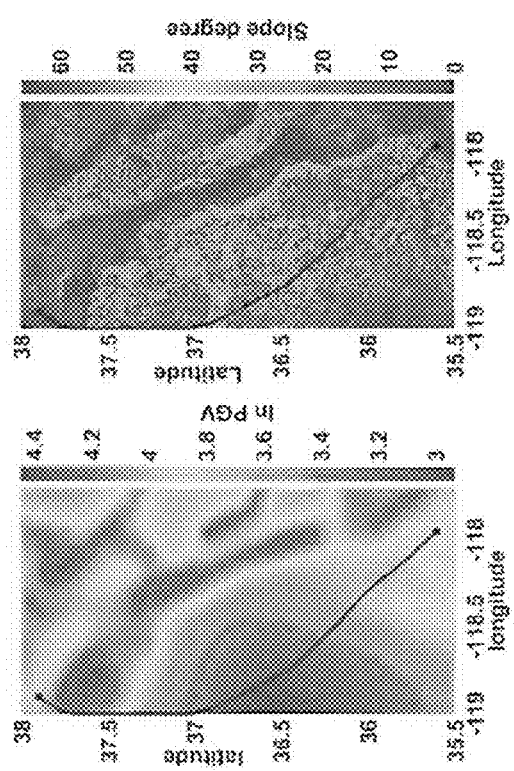

From FIGS. 6A-6F, it is evident that the greater the laying cost, the less the total number of repairs. There are two means to reduce the total number of repairs, either by adding segments with protection (see the black lines in FIG. 6C), or by increasing the length of the cable to avoid the high risk areas shown by FIG. 6B. In FIG. 6A, the weight value c=0, so that only the laying cost is considered, and the cable tends to avoid the high slope areas but passes through the high PGV areas. With increasing weight value c, as shown by FIGS. 6B and 6C, the path of the cable is designed to keep away from the high PGV areas or add segments deployed in the high PGV areas with protection to reduce the total number of repairs.

Figure 7:
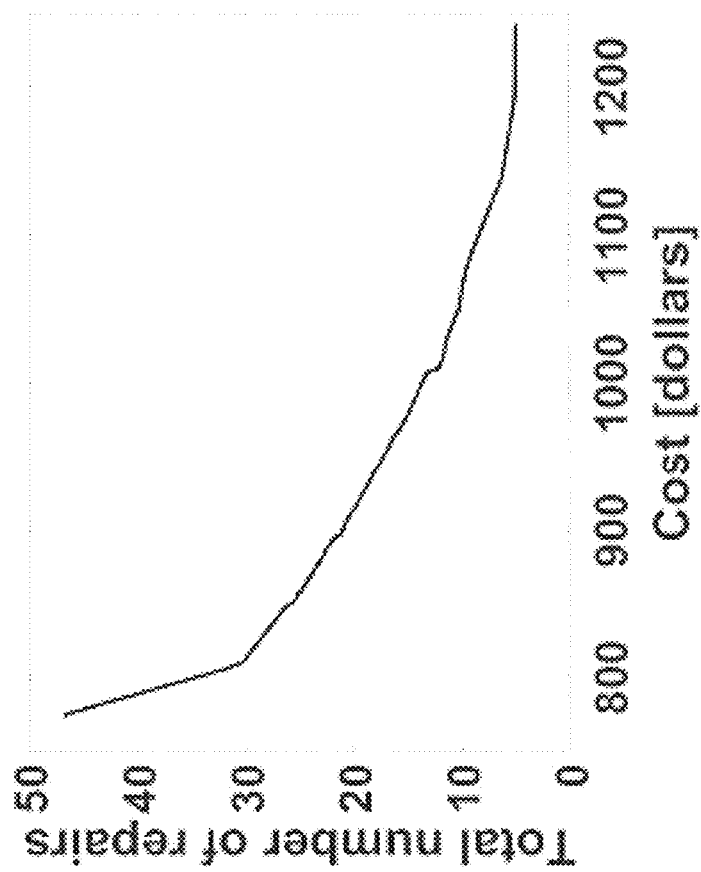
FIG. 7 is a graph showing non-dominated front for two objectives—total number of repairs and cable laying cost.

FIG. 7 is a graph showing non-dominated front for two objectives—total number of repairs and cable laying cost, obtained from FIGS. 6A-6F and Table I. It is shown that avoiding the high PGV regions and adopting a higher design level in high PGV regions are effective in reducing the total number of repairs.

Advantage

The method in the embodiment has provided a solution to address the problem of path and shielding level optimization for a cable connecting two points on Earth's surface while taking into account of high risk areas (including earthquake prone areas) as well as risk of ROV instability.

Advantageously, the ROV stability risk has been incorporated in the laying cost to discourage the path from traversing areas with high slopes. By including the instability risk of ROV depending on the direction of the path and the slope of the terrain, the present invention is effective in minimizing the arrangement cost in laying an infrastructure link, for example, by reducing the likelihood of capsize of a ROV as it buries the cable in an uneven terrain.

Using laying cost and total number of repairs of the cable as the two objectives, the problem is formulated as a multi-objective optimal control problem, and subsequently converted into a single objective optimal control problem by the weighted sum method. By applying DPP, a variant of the HJB equation was derived for the single objective optimal control problem. Ordered Upwind Method (OUM) is used to solve the HJB equation, and thereby produces high quality cable path solutions. The present invention obtained approximate Pareto fronts for the two objectives, the laying cost and the total number of repairs, and provides insight and guidance to design tradeoffs between cost effectiveness and seismic resilience.

Exemplary System

Figure 8:
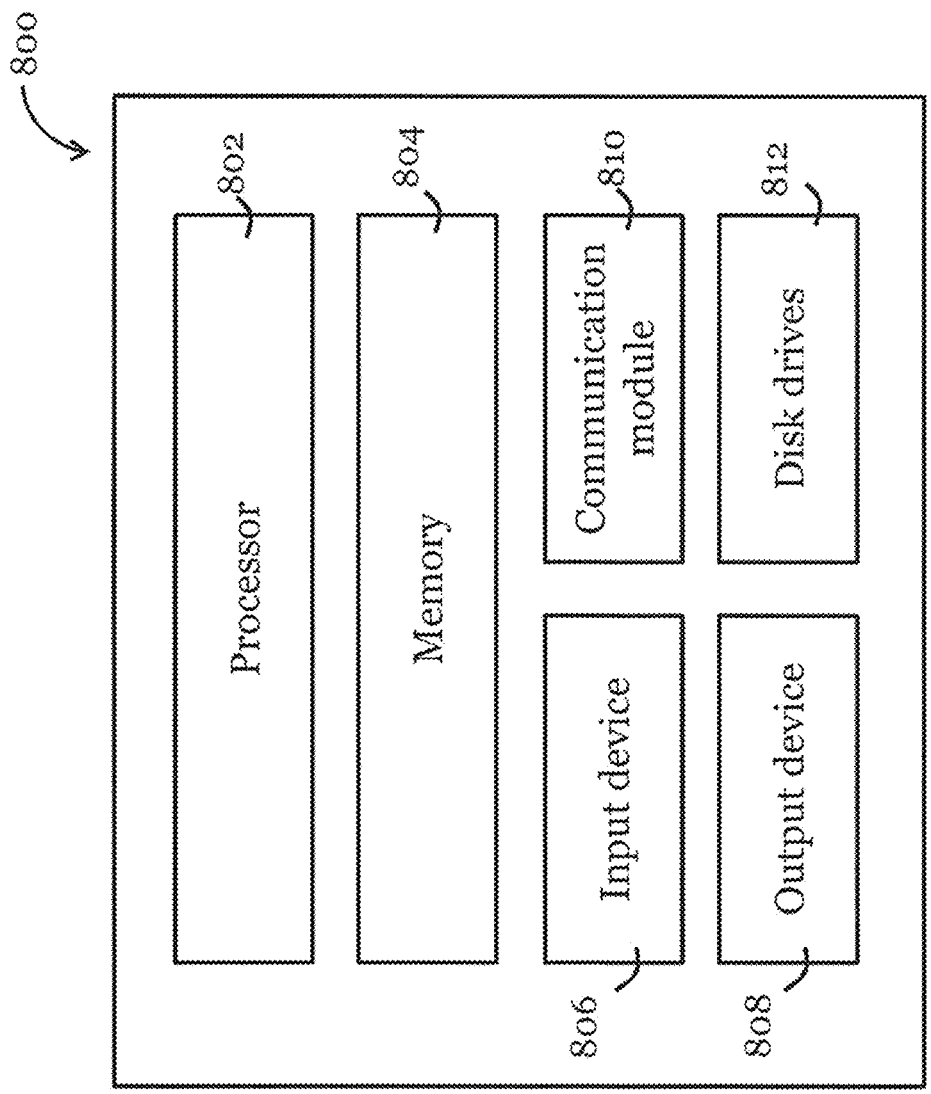
FIG. 8 is an information handling system that can be configured to operate the method in one embodiment of the invention.

Referring to FIG. 8, there is shown a schematic diagram of an exemplary information handling system 1100 that can be used as a server or other information processing systems in one embodiment of the invention for performing the method in the invention. Preferably, the server 800 may have different configurations, and it generally comprises suitable components necessary to receive, store and execute appropriate computer instructions or codes. The main components of the server 800 are a processing unit 802 and a memory unit 804. The processing unit 802 is a processor such as a CPU, an MCU, etc. The memory unit 804 may include a volatile memory unit (such as RAM), a non-volatile unit (such as ROM, EPROM, EEPROM and flash memory) or both. Preferably, the server Boo further includes one or more input devices 806 such as a keyboard, a mouse, a stylus, a microphone, a tactile input device (e.g., touch sensitive screen) and a video input device (e.g., camera), The server 800 may further include one or more output devices 808 such as one or more displays, speakers, disk drives, and printers. The displays may be a liquid crystal display, a light emitting display or any other suitable display that may or may not be touch sensitive. The server 800 may further include one or more disk drives 812 which may encompass solid state drives, hard disk drives, optical drives and/or magnetic tape drives. A suitable operating system may be installed in the server 800, e.g., on the disk drive 812 or in the memory unit 804 of the server 800. The memory unit 804 and the disk drive 812 may be operated by the processing unit 802. The server 800 also preferably includes a communication module 810 for establishing one or more communication links (not shown) with one or more other computing devices such as a server, personal computers, terminals, wireless or handheld computing devices. The communication module 810 may be a modem, a Network Interface Card (NIC), an integrated network interface, a radio frequency transceiver, an optical port, an infrared port, a USB connection, or other interfaces. The communication links may be wired or wireless for communicating commands, instructions, information and/or data. Preferably, the processing unit 802, the memory unit 804, and optionally the input devices 806, the output devices 808, the communication module 810 and the disk drives 812 are connected with each other through a bus, a Peripheral Component Interconnect (PCI) such as PCI Express, a Universal Serial Bus (USB), and/or an optical bus structure. In one embodiment, some of these components may be connected through a network such as the Internet or a cloud computing network. A person skilled in the art would appreciate that the server 800 shown in FIG. 8 is merely exemplary, and that different servers 800 may have different configurations and still be applicable in the invention.

Although not required, the embodiments described with reference to the Figures can be implemented as an application programming interface (API) or as a series of libraries for use by a developer or can be included within another software application, such as a terminal or personal computer operating system or a portable computing device operating system. Generally, as program modules include routines, programs, objects, components and data files assisting in the performance of particular functions, the skilled person will understand that the functionality of the software application may be distributed across a number of routines, objects or components to achieve the same functionality desired herein.

It will also be appreciated that where the methods and systems of the invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

It will be appreciated by persons skilled in the art that numerous variations and/or modifications may be made to the invention as shown in the specific embodiments without departing from the spirit or scope of the invention as broadly described. For example, the method can be applied to determine optimal laying arrangement of any infrastructure link, including fluid pipeline (e.g., oil, water, and gas pipes), electric power cables, electric data cables, optical cables, etc. The present embodiments are to be considered in all respects as illustrative, not restrictive.

The invention claimed is:

1. A computer-implemented method for determining optimal path arrangements for a sub-marine cable between two geographic locations, comprising:
  modelling, using one or more processors, a geographic terrain containing the two geographic locations,
  the modelling including modelling the geographic terrain into a grid with multiple grid points such that each point on the model is denoted by a 3D coordinate including altitude of the geographic terrain;
  optimizing, using the one or more processors, an arrangement cost and a repair rate for two or more potential paths for the sub-marine cable based on the modelled geographic terrain, an arrangement cost model, and a repair rate model, taking into account at least one design level, wherein the arrangement cost model incorporates direction-dependent arrangement cost factors and direction-independent arrangement cost factors associated with path arrangements of the two or more potential paths, the direction-dependent arrangement cost factors being associated with a capsize risk of a remotely operated vehicle arranged to lay the sub-marine cable;
  determining, using the one or more processors, and based on the optimization, the optimal path arrangements each including multiple path portions and the at least one design level associated with the path portions;
  and displaying, at a display operably connected with the one or more processors, at least one of the optimized path arrangements on a map of the geographic terrain;
  wherein the optimization comprises:
  calculating a minimum weighted cost value over the at least one design level for each point on the modelled geographic terrain;
  transforming the optimization to a Hamilton-Jacobi-Bellman equation based on the calculated minimum weighted cost value;
  and applying Ordered Upwind Method to solve the Hamilton-Jacobi-Bellman equation for determining the optimal path arrangements;
  and wherein determining the optimal path arrangements comprises:

determining a set of Pareto optimal solutions representing the optimal path arrangements, wherein the optimal path arrangements are optimal laying paths,
wherein the arrangement cost model models the direction-dependent arrangement cost factors as $$h_1(x,a)=e^{q1(x,a)-\theta_1}+e^{q2(x,a)-\theta_2},$$

where wherein $h_1$ is the direction dependent arrangement cost, x is the 3D coordinate of the grid point, a is a direction of the path, e is an exponential function, $q_1(x, a)$ is a slope parallel to the direction of the path as a function of x and a, $q_2(x, a)$ is a slope perpendicular to the direction of the path as a function of x and a, $\theta_1$ is a threshold representing an allowable maximum slope parallel to the direction of the path, and $\theta_2$ is a threshold representing an allowable maximum slope perpendicular to the direction of the path.

2. The computer-implemented method of claim 1, further comprising receiving input associated with dimensions of the grid points for modelling the geographic terrain.

3. The computer-implemented method of claim 1, further comprising receiving input associated with the two geographic locations.

4. The computer-implemented method of claim 1, wherein the direction-independent arrangement cost factors comprise arrangement costs associated with: labor, licenses, or protection level.

5. The computer-implemented method of claim 1, further comprising receiving input associated with the direction-dependent arrangement cost factors and the direction-independent arrangement cost factors.

6. The computer-implemented method of claim 1, wherein the direction-independent arrangement cost factors are associated with location and the design level of the path for each portion of a path, and wherein the arrangement cost model sums the arrangement cost per unit length of a path to determine an arrangement cost of the path.

7. The computer-implemented method of claim 1, wherein the repair rate model is based on spatially distributed ground motion intensity associated with the geographic terrain in which the path is arranged.

8. The computer-implemented method of claim 7, wherein the spatially distributed ground motion intensity comprises peak ground velocity.

9. The computer-implemented method of claim 1, wherein the repair rate model is based on spatially distributed ground motion intensity associated with the geographic terrain of each portion of a path and sums the repair rate per unit length of a path to determine a repair rate of the path.

10. The computer-implemented method of claim 1, wherein the sub-marine cable is a sub-marine optical cable.

11. An information handling system for determining optimal path arrangements for a sub-marine cable between two geographic locations, comprising:
one or more processors arranged to:
model a geographic terrain containing the two geographic locations, including modelling the geographic terrain into a grid with multiple grid points such that each point on the model is denoted by a 3D coordinate including altitude of the geographic terrain;
optimize an arrangement cost and a repair rate for two or more potential paths based on the modelled geographic terrain, an arrangement cost model, and a repair rate model, taking into account at least one design level, wherein the arrangement cost model incorporates direction-dependent arrangement cost factors and direction-independent arrangement cost factors associated with path arrangements of the two or more potential paths, the direction-dependent arrangement cost factors being associated with a capsize risk of a remotely operated vehicle arranged to lay sub-marine cable; and
determine, based on the optimization, the optimal path arrangements each including multiple path portions and the at least one design level associated with the path portions; a display operably connected with the one or more processors and arranged to display the determined optimal path arrangements on a map of the geographic terrain;
wherein the one or more processors are arranged to perform the optimization by, at least:
calculating a minimum weighted cost value over the at least one design level for each point on the modelled geographic terrain; transforming the optimization to a Hamilton-Jacobi-Bellman equation based on the calculated minimum weighted cost value;
and applying Ordered Upwind Method to solve the Hamilton-Jacobi-Bellman equation for determining the optimal path arrangements; and wherein the one or more processors are arranged to determine the optimal path arrangements by, at least:
determining a set of Pareto optimal solutions representing the optimal path arrangements, wherein the optimal path arrangements are optimal laying paths; wherein the arrangement cost model models the direction-dependent arrangement cost factors as $$h_1(x,a)=e^{q1(x,a)-\theta_1}+e^{q2(x,a)-\theta_2},$$

where wherein $h_1$ is the arrangement cost model, x is the 3D coordinate of the grid point, a is a direction of the path, e is an exponential function, $q_1(x, a)$ is a slope parallel to the direction of the path as a function of x and a, $q_2(x, a)$ is a slope perpendicular to the direction of the path as a function of x and a, $\theta_1$ is a threshold representing an allowable maximum slope parallel to the direction of the path, and $\theta_2$ is a threshold representing an allowable maximum slope perpendicular to the direction of the path.

12. The computer-implemented method of claim 1, wherein the optimizing of the two or more potential paths takes into account at least two design levels each corresponding to a respective level of shielding for the sub-marine cable, and wherein the multiple path portions of a corresponding optimal path arrangement define a shape of the corresponding optimal path arrangement and having the at least two design levels such that the corresponding optimal path arrangement is a non-homogenous path arrangement with different levels of shielding for at least some of the path portions.

13. The information handling system of claim 11, wherein the optimization of the two or more potential paths by the one or more processors takes into account at least two design levels each corresponding to a respective level of shielding for the sub-marine cable, and wherein the multiple path portions of a corresponding optimal path arrangement define a shape of the corresponding optimal path arrangement and having the at least two design levels such that the corresponding optimal path arrangement is a non-homogenous path arrangement with different levels of shielding for at least some of the path portions.

* * * * *